Aug. 8, 1939. H. J. HORN 2,169,047
VEHICLE WHEEL
Filed Aug. 5, 1936
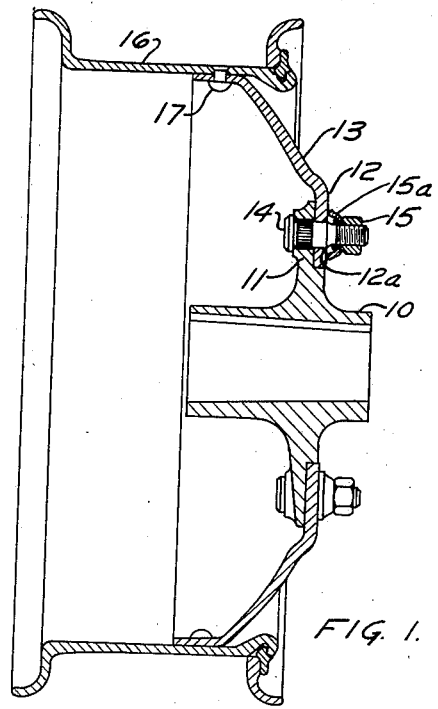
FIG. 1.
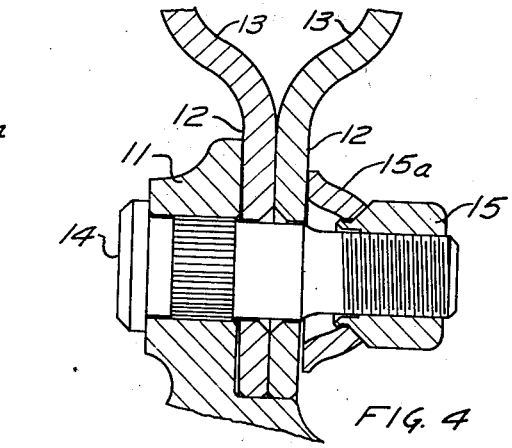
FIG. 4
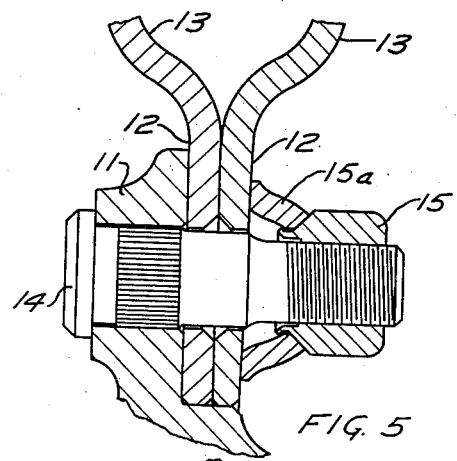
FIG. 5
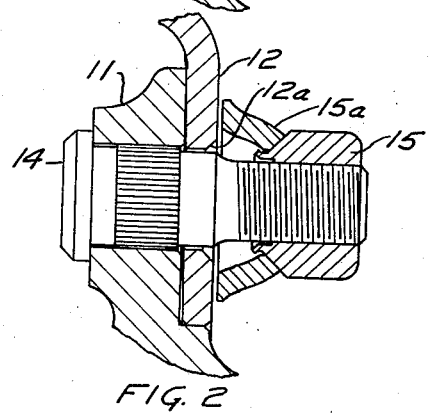
FIG. 2
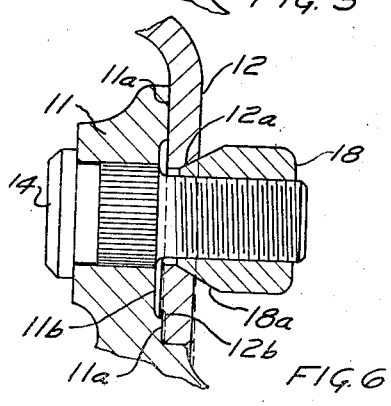
FIG. 3
FIG. 6
INVENTOR.
HARRY J. HORN
BY
Carroll R. Saber
ATTORNEY.

Patented Aug. 8, 1939

2,169,047

UNITED STATES PATENT OFFICE 2,169,047

VEHICLE WHEEL

Harry J. Horn, Lansing, Mich., assignor to Motor Wheel Corporation, Lansing, Mich., a corporation of Michigan Application August 5, 1936, Serial No. 94,420

6 Claims. (Cl. 301—9)

This invention relates to vehicle wheels and more particularly to an improved construction of the bolting on flange of a wheel body which permits the mounting of one or two wheel bodies upon a hub so that the wheel bodies are flexed when clamped to the hub. Illustrative embodiments of the present invention are shown in the accompanying drawing, wherein—

Figure 1 is a radial sectional view of a vehicle wheel;

Figure 2 is an enlarged fragmentary sectional view of a portion of the wheel shown in Figure 1 illustrating the relation of the parts before the securing means has been tightened;

Figure 3 is an enlarged fragmentary sectional view corresponding to that of Figure 2 showing the relation of the parts after the clamping nut has been tightened;

Figure 4 is a fragmentary sectional view of a vehicle wheel showing a pair of wheel bodies mounted upon a hub and illustrating the relation of the parts before the clamping nuts have been tightened;

Figure 5 is a fragmentary sectional view of the construction shown in Figure 4 illustrating the relation of the parts after the clamping nuts have been tightened; and Figure 6 is a fragmentary sectional view of a construction similar to that shown in Figures 1, 2 and 3, illustrating a slightly modified form of bolting on flange.

The wheel illustrated in Figure 1 includes a hub 10 having a radial flange 11 to which is secured a bolting on flange 12 of a wheel body 13 by means of the securing bolts 14 and the clamp nuts 15. The bolting on flange 12 is provided with a plurality of circumferentially spaced openings 12a for the reception of the securing bolts 14. The clamp nut 15 includes a washer 15a loosely swivelled to the base of the nut proper. A conventional form of wheel rim 16 is secured to the periphery of the wheel body 13 by means of rivets 17.

The present invention has to do with a novel construction of the bolting on flange 12 by means of which the bolting on flange is flexed when it is clamped against the hub flange. The advantage of securing a wheel body to a hub under tension in this manner is well known to those skilled in the art.

This result is obtained in accordance with the present invention by forming the portion of the bolting on flange radially inwardly of the securing bolt openings of a thickness less than the thickness of the bolting on flange outwardly of the securing bolt openings. Thus, when the bolting on flange is clamped against the hub flange by tightening the clamp nuts 15 upon the securing bolts 14 the radially outer portion of the bolting on flange contacts the radially outer portion of the hub flange before the radially inner portion of the bolting on flange contacts the corresponding portion of the hub flange. When the clamping nuts are threaded home sufficiently to bring the radially inner portion of the bolting on flange into contact with the radially inner portion of the hub flange the bolting on flange is flexed whereby the wheel body is placed under tension.

In one form of the invention as shown in Figures 1, 2 and 3, one surface of the bolting on flange is tapered radially inwardly to provide the desired reduction in the thickness of that portion of the bolting on flange. The relation of the radially inner portion of the bolting on flange to the corresponding portion of the hub flange before the clamping nuts 15 are tightened upon the securing bolts 14 is illustrated in Figure 2. The relation of these parts after the clamping nuts 15 have been tightened upon the securing bolts 14 is illustrated in Figure 3.

Figures 4 and 5 illustrate the manner in which a pair of disks 13 may be mounted upon a single hub to provide a dual wheel construction. As there shown the wheel bodies 13 are mounted upon the hub in reverse or opposed position to bring together the flat radial surfaces of the bolting on flanges of the two wheel bodies and to locate the tapered surfaces of the bolting on flanges remote from each other.

The relation of these several parts before the clamping nuts 15 are threaded home upon the securing bolts 14 is illustrated in Figure 4. As there shown the radially outer portion of the inner bolting on flange 12 is contacting the corresponding portion of the hub flange 11 while the radially inner portion of that bolting on flange is spaced from the corresponding portion of the hub flange 11 and the radially inner portion of the other bolting on flange is spaced from the adjacent portion of the washer 15a.

The relation of the parts just referred to after the clamping nuts 15 have been threaded home upon the securing bolts 14 is shown in Figure 5. Of course, it will be understood that the connection between the washer 15a and the clamping nut proper 15 is of such character as to permit the washer to assume the position required of it in clamping the radially inner portion of the bolting on flanges 12 against the radially inner portion of the hub flange 11.

A different manner of providing for the reduced thickness of the radially inner portion of the bolting on flange is illustrated in Figure 6. As there shown the hub flange 11 is provided with a pair of annular contact surfaces 11a lying in the same radial plane and spaced from each other by the annular groove 11b. The radially inner portion of one surface of the bolting on flange 12 is cut away as indicated at 12b to reduce the thickness of that portion of the bolting on flange to such extent that the bolting on flange is flexed when the surface at 12b is forced into contact with the adjacent face 11a of flange 11.

A form of securing means different than that previously described is shown in Figure 6. As there shown the securing bolt 14 is substantially the same as that illustrated in the other figures, but the securing nut 18 is of a different character. It does not include a clamping washer but has its outer surface tapered as indicated at 18a to engage the correspondingly tapered entrance to opening 12a. The relative position of the parts before and after the nut 18 is threaded home upon the securing bolt 14 is illustrated in Figure 6 by the use of full and dotted lines. The dotted lines show the position of the bolting on flange 12 before the nut is tightened, and the full lines show the position of the bolting on flange with respect to the hub flange after the nut is tightened.

Only typical embodiments of the present invention have been herein shown and described. Obviously the invention readily lends itself to various other embodiments. The appended claims define the scope of the invention.

I claim:

1. A vehicle wheel including, in combination, a hub flange having a radial surface, a wheel having a bolting on flange with a radial surface remote from the hub flange, the radially inner portion of the bolting on flange being of reduced thickness to the extent that the bolting on flange is flexed when it is clamped against the hub flange, and securing means for clamping the bolting on flange against the hub flange.

2. A vehicle wheel including, in combination, a hub having a radial flange provided with annular faces lying in the same radial plane spaced from each other by an annular groove, a wheel body including a substantially radially extending bolting on flange for engagement with the two annular faces of the hub flange, the portion of the bolting on flange adapted for engagement with the radially inner annular face being of reduced thickness to such extent that the bolting on flange is flexed when it is clamped against said faces, and securing means for clamping the bolting on flange against the faces.

3. A vehicle wheel including, in combination, a hub having a radial flange provided with annular faces lying in the same radial plane spaced from each other by an annular groove, a wheel body including a substantially radially extending bolting on flange for engagement with the two annular faces of the hub flange, the surface of the bolting on flange adapted for engagement with the radially inner annular face being cut away to such extent that the bolting on flange is flexed when it is clamped against the annular faces of the hub flange, and securing means for clamping the bolting on flange against the annular faces of the hub flange.

4. A vehicle wheel including, in combination, a hub having a radial flange, a pair of wheel bodies mounted upon the hub flange, each of said wheel bodies including a bolting on flange having a radially inner portion of reduced thickness, one surface of each of said bolting on flanges lying in a continuous radial plane, said wheel bodies being mounted on the hub with the last mentioned surface of the one contacting the corresponding surface of the other, the surfaces of the hub flange and of the axially adjacent surfaces of the bolting on flanges being diverse to the extent that the bolting on flange of each wheel body is flexed when the disks are clamped to the hub flange, and securing means for clamping the disks to the hub flange.

5. A vehicle wheel including, in combination, a substantially radially extending hub flange, a wheel body having a substantially radially extending bolting on flange for engagement with the hub flange, the bolting on flange being arranged for engagement with both the radially inner and outer portions of the hub flange, the radially inner engaging portion of one of said flanges being spaced both radially and axially from the radially outer portion of said flange, and the radially inner and outer engaging portions of the other of said flanges lying in the same radial plane whereby the bolting on flange is flexed when it is clamped against the hub flange, and securing means for clamping the bolting on flange against the hub flange.

6. A vehicle wheel including, in combination, a hub flange having a face including radially inner and outer engaging portions lying in the same radial plane, a pair of wheel bodies mounted upon the hub flange, each of said wheel bodies including a bolting on flange adapted to be mounted in juxtaposed substantially parallel relation, the bolting on flange adjacent from the hub flange having a frusto-conical surface toward the hub flange whereby said last mentioned bolting on flange is flexed when the wheel bodies are clamped to the hub flange, and securing means for clamping the bolting on flanges on said hub flange.

HARRY J. HORN.